United States Patent [19]

Bjorner et al.

[11] Patent Number: 5,313,373

[45] Date of Patent: May 17, 1994

[54] APPARATUS FOR THE UNIFORM ILLUMINATION OF A SURFACE

[75] Inventors: Johannes A. S. Bjorner, Woodbury; Kevin Y. Hamada; Kenneth A. Lais, both of Danbury, all of Conn.

[73] Assignee: United Parcel Service of America, Inc., Atlanta, Ga.

[21] Appl. No.: 981,242

[22] Filed: Nov. 25, 1992

[51] Int. Cl.⁵ ................................................ F21V 9/14
[52] U.S. Cl. .................................... 362/19; 362/17; 362/293; 362/346
[58] Field of Search ................ 359/599; 362/3, 8, 16, 362/17, 19, 346, 347, 354, 359, 293

[56] References Cited

U.S. PATENT DOCUMENTS

| | | | |
|---|---|---|---|
| 2,308,009 | 1/1943 | Hood et al. | 362/347 |
| 2,794,365 | 6/1957 | Baasner et al. | 362/293 |
| 3,028,483 | 4/1962 | Simmon | 362/293 |
| 3,112,075 | 11/1963 | Sparks | 362/293 |
| 3,216,317 | 11/1965 | Nail . | |
| 3,511,211 | 5/1970 | Horne et al. | 362/19 |
| 3,716,298 | 2/1973 | Reardon | 362/19 |
| 3,878,385 | 4/1975 | Kingston | 362/17 |
| 3,996,476 | 12/1976 | Lazzara | 250/563 |
| 4,335,302 | 6/1982 | Robillard | 235/462 |
| 4,404,620 | 9/1983 | Takahashi et al. | 362/346 |
| 4,409,646 | 10/1983 | Baliozian | 362/17 |
| 4,488,679 | 12/1984 | Bockholt et al. | 235/469 |
| 4,500,776 | 2/1985 | Laser | 235/162 |
| 4,603,976 | 8/1986 | Fetzer et al. | 356/402 |
| 4,737,653 | 4/1988 | Nakagawa et al. | 250/578 |
| 4,739,159 | 4/1988 | Inokuchi | 250/216 |
| 4,766,300 | 8/1988 | Chadima, Jr. et al. | 235/472 |
| 4,777,566 | 10/1988 | Lowell et al. | 362/3 |
| 4,818,847 | 4/1989 | Hara et al. | 235/455 |
| 4,877,949 | 10/1989 | Danielson et al. | 235/462 |
| 4,947,291 | 8/1990 | McDermott | 362/19 |
| 5,019,699 | 5/1991 | Koenck | 235/472 |
| 5,027,418 | 6/1991 | Ikegaya et al. | 382/8 |
| 5,032,960 | 7/1991 | Katoh | 362/240 |
| 5,046,159 | 9/1991 | Hamanaka | 355/1 |
| 5,075,827 | 12/1991 | Smith | 362/346 |
| 5,081,343 | 1/1992 | Chadima, Jr. et al. | 235/472 |

FOREIGN PATENT DOCUMENTS

| | | |
|---|---|---|
| 0405965 | 1/1991 | European Pat. Off. . |
| 0524029 | 1/1993 | European Pat. Off. ...... G06K 7/10 |
| 1252108 | 11/1971 | United Kingdom . |

Primary Examiner—Ira S. Lazarus
Assistant Examiner—Alan B. Cariaso
Attorney, Agent, or Firm—James A. Drobile; William H. Murray; Robert E. Rosenthal

[57] ABSTRACT

An apparatus for providing uniform illumination to a surface includes a chamber defined by a wall, the wall having an opaque wall portion and a partially transparent wall portion. A light source such as a flash lamp, is mounted in the chamber. The interior surface of the chamber wall is light-reflective. The partially transparent wall portion has transparent apertures which permit light to exit the light chamber. The partially transparent wall portion has a first section with a first average transparency and a second section with a second average transparency. In operation, the apparatus completely covers a target surface while light generated by the light source either directly exits the light chamber through the transparent apertures or is reflected off the reflective interior surfaces of the light chamber before exiting the light chamber through the transparent apertures, uniformly illuminating the target surface.

19 Claims, 6 Drawing Sheets

APPARATUS FOR THE UNIFORM ILLUMINATION OF A SURFACE

BACKGROUND OF THE INVENTION

This invention relates to an apparatus for providing uniform illumination to a surface during the electronic imaging/optical scanning process, particularly a surface having information contained thereon in either a code or alphanumeric format.

Electronic imaging/optical scanning devices were developed to electronically recreate an image of the surface of an object. The electronic image is created by holding the imaging/scanning device directly over the surface to be imaged/scanned. Typically, appropriate lensing focuses the image on a CCD array. The image is converted to electronic data. The electronic data is then stored or transmitted to an appropriate data processing apparatus.

To expedite the processing of routine information, electronic imaging/optical scanning devices are used to retrieve data or information printed on or affixed to the surface of an object in code or alphanumeric format. A common example is a bar code label affixed to the surface of a package. The bar code label contains information about the package's origin, destination, order number, and the like. To retrieve the information from the bar code label, an electronic imaging/optical scanning device electronically creates a digitized image of the bar code label and transfers that image to a processing computer. The processing computer then deciphers the desired information from the digitized image. Electronic imaging/optical scanning devices can be either machine mounted or hand-held. Portable hand-held devices are especially useful when processing is required at remote locations.

The ability to retrieve data or information from the surface of an object depends largely on the quality of the digital image obtained by the electronic imaging/optical scanning device. Glare, shadows and non-uniformity in illumination on the surface during the imaging/scanning process can result in degradation of the digital image. A poor digital image can lead to loss of data. Uniform illumination over a surface is especially important when reading information on an alphanumeric label or in a two-dimensional encoded format. For example, it may be desired to obtain an electronic image of an address label for transmission to optical character recognition devices.

Known electronic imaging/optical scanning devices seek to reduce non-uniformity in illumination by using an internal light source in conjunction with a series of mirrors or reflectors. Such devices, as represented by the patents discussed below, use internally mounted mirrors or reflectors to redirect or concentrate the light generated by the internal light source onto the target surface. The redirected or concentrated light is therefor sufficient to illuminate the target surface and strong enough to overwhelm and block out ambient light during the imaging or scanning process.

Examples of these various electronic imaging/optical scanning devices include U.S. Pat. No. 3,216,317 entitled "Transposition Device and Document Processor in Character Sensing," issued to Nail on Nov. 9, 1965; U.S. Pat. No. 4,335,302 entitled "Bar Code Scanner Using Non-Coherent Light Source," issued to Robillard on Jun. 12, 1982; U.S. Pat. No. 4,603,976 entitled "Optical Mark Recognition Apparatus," issued to Fetzer, et al. on Aug. 5, 1986; U.S. Pat. No. 4,739,159 entitled "Optical Read Out Apparatus Using a Roof Mirror Lens Array," issued to Inokuchi on Apr. 19, 1988; U.S. Pat. No. 5,046,159 entitled "Image Transmitting Element and Process For Producing Same," issued to Hamanaka on Sep. 3, 1991; and U.S. Pat. No. 5,081,343 entitled "Instant Portable Bar Code Reader," issued to Chadima, Jr., et al. on Jan. 14, 1992. These patents all disclose the use of internally mounted light sources where light is redirected or concentrated onto the target surface by use of internally mounted mirrors or reflectors. U.S. Pat. No. 5,046,159 discloses the use of a transparent substrate with multiple photo-transmissible holes for receiving light energy, and U.S. Pat. No. 5,081,343 discloses the use of a flash lamp light source.

None of these patents, however, provide an apparatus for uniformly illuminating a target surface. By redirecting or concentrating light onto the target surface through mirrors or reflectors, these devices can frequently produce glare and/or shadows on the surface resulting in loss of data during the electronic imaging/optical scanning process.

Accordingly it is an object of this invention to provide an electronic imaging/optical scanning device lighting source that provides uniform illumination across the surface to be imaged or scanned.

Further objects and advantages of the invention will become apparent from the detailed description of a preferred embodiment set forth below.

SUMMARY OF THE INVENTION

An apparatus for illuminating a surface includes a chamber, defined by a wall, the wall having an opaque portion and a partially transparent portion, the partially transparent portion having a first section with a first average transparency and a second section with a second average transparency, and a light source disposed interior to the chamber.

An illumination apparatus includes a wall defining a chamber, a light source disposed in the chamber, the wall including an opaque wall portion and a substantially planner partially transparent wall portion having an average transparency variable with respect to position on the partially transparent wall portion, and including an opaque sheet having at least two openings which permit light to exit the interior of the chamber defined therein, the partially transparent wall portion further including light diffusing means adjacent to an exterior of the opaque sheet, all interior surfaces of the chamber being reflective of light generated by the light source.

A method for illuminating a surface for imaging of the surface by a camera, includes the steps of providing a wall, defining a chamber, the wall including an opaque wall portion and a partially transparent wall portion, the partially transparent wall portion having a first section with a first average transparency and a second section having a second average transparency, a camera-receiving aperture being defined through the partially transparent wall portion; disposing a camera lens through the camera-receiving aperture to a predetermined position with respect to the surface; and activating a light source in the chamber to illuminate the surface.

An apparatus for uniformly illuminating a surface includes a generally sleeve-like shroud having an opaque, generally vertical wall, defining a lower opening; and a light source disposed in the shroud; an interior surface of the wall having a first region about the lower opening having a first light reflectivity, and a second region, above the first region, having a second light reflectivity, the first light reflectivity being greater than the second light reflectivity.

BRIEF DESCRIPTION OF THE FIGURES

FIG. 4b is a section taken along line 4a—4a of FIG. 4a.

FIG. 5b is a section taken along line 5—5 of FIG. 5a.

DETAILED DESCRIPTION OF A PREFERRED EMBODIMENT

Figure 1:
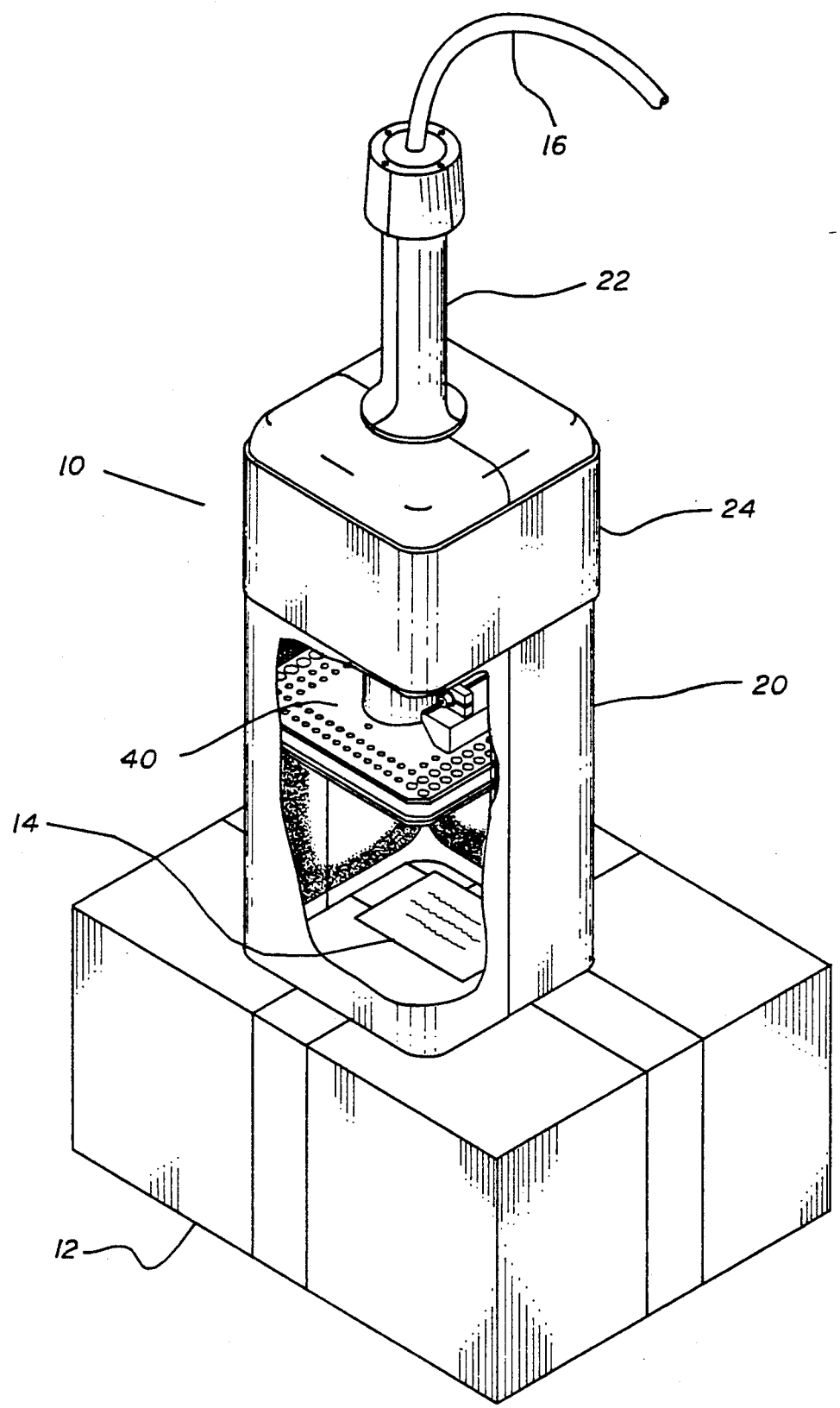
FIG. 1 is an isometric view with partial cut-away of an apparatus according to the invention in use.

Referring to FIG. 1, there is shown a fully-assembled electronic imaging/optical scanning apparatus 10 with internally disposed light chamber assembly 40 according to the invention in use, in partial cut-away. Apparatus 10 is shown in use in obtaining an image of label 14 affixed to a surface of package 12. Apparatus 10 is placed on the surface of package 12. Apparatus 10 is positioned so as to completely cover label 14. Diffuse light generated by light chamber assembly 40 uniformly illuminates label 14 while label 14 is imaged by CCD assembly 30 (not shown) disposed inside apparatus 10. An electronic signal representing the image of label 14 obtained by CCD assembly 30 (not shown) is then transmitted from apparatus 10 to a processing computer (not shown) external to apparatus 10 through multiconductor cable 16.

Figure 2:
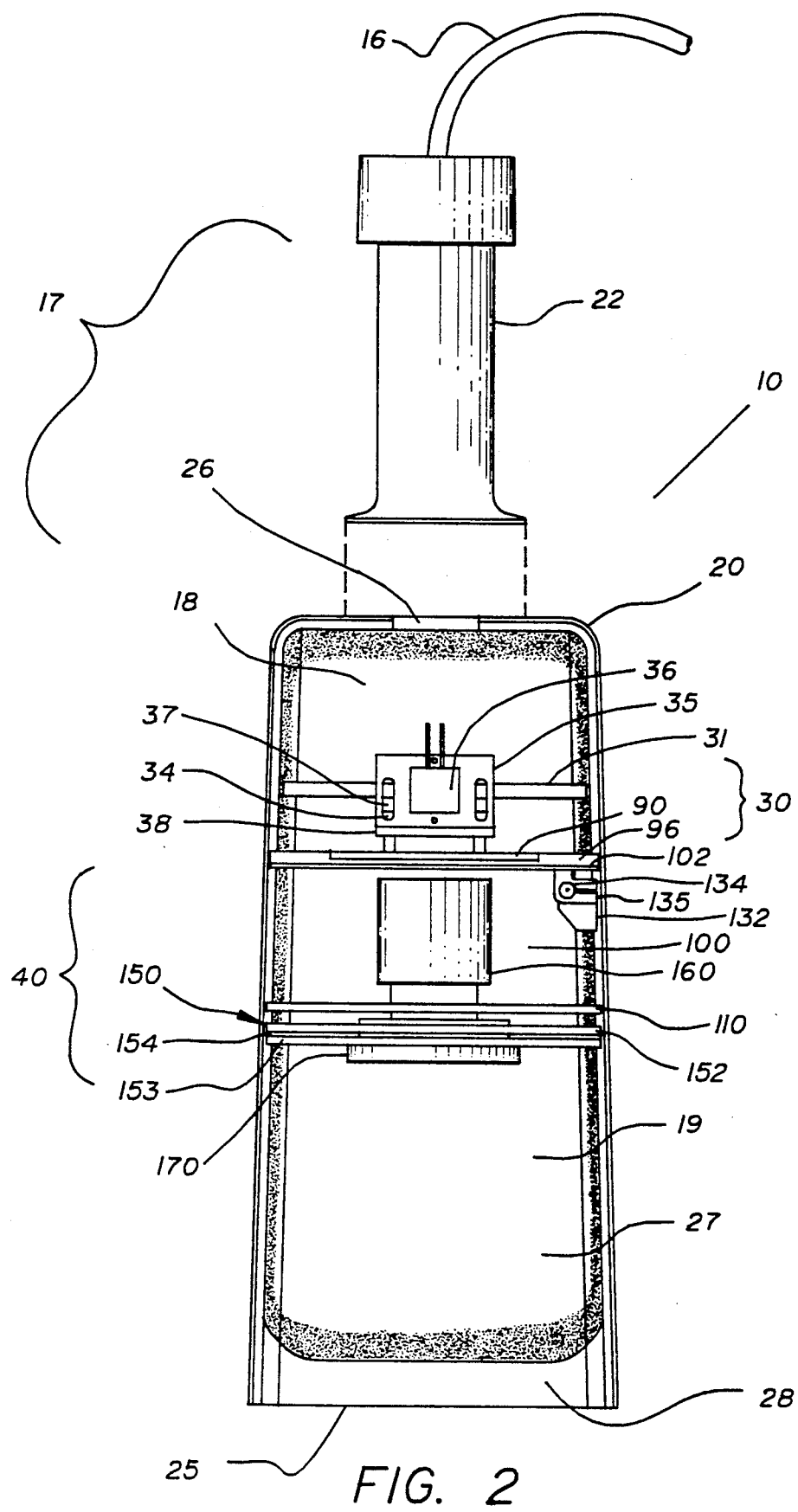
FIG. 2 is a front elevational view of an apparatus according to the invention with the heat sink and one-half of the shroud removed.
Figure 3A:
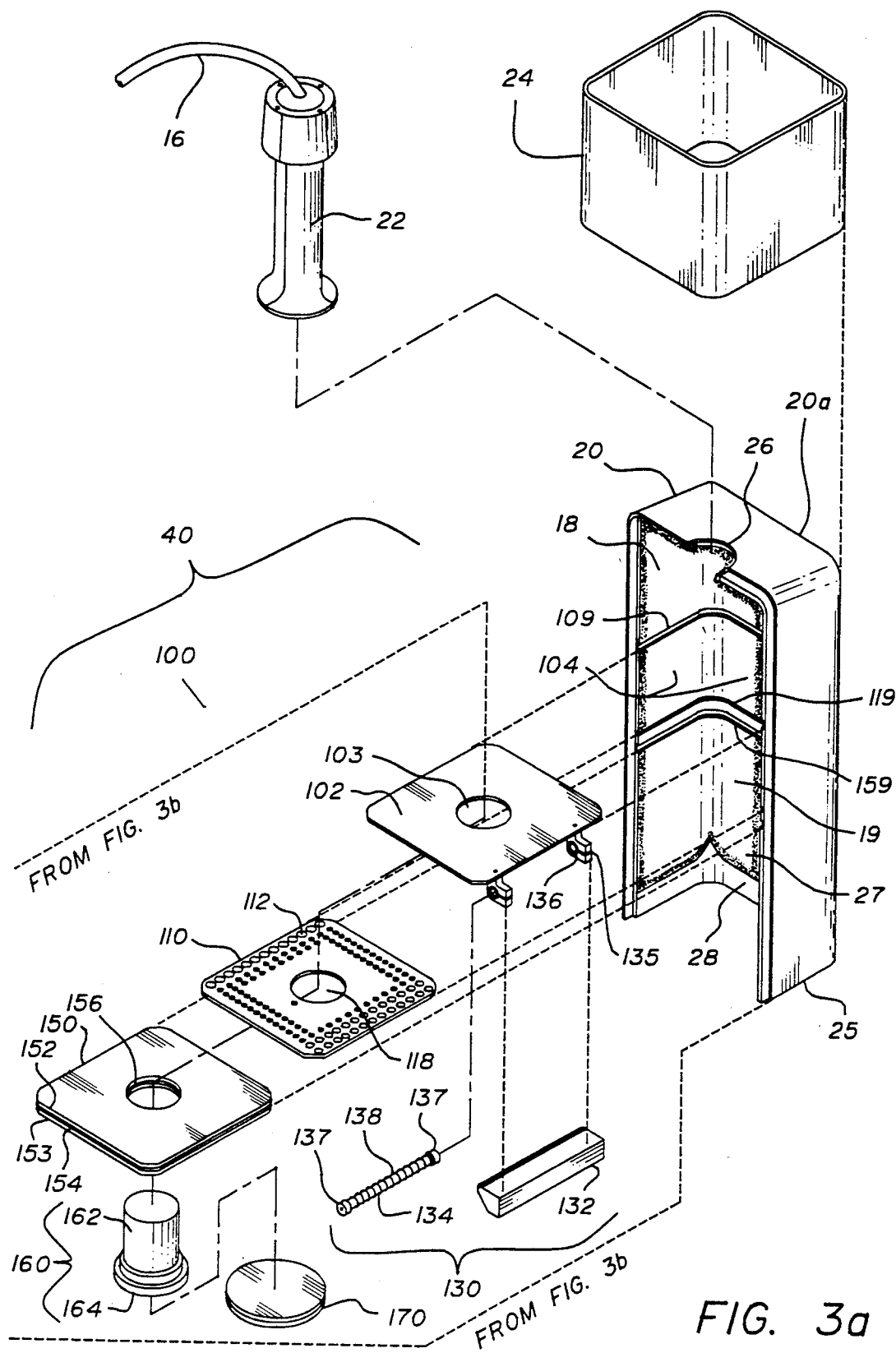
FIGS. 3a and 3b are an exploded isometric view of an apparatus according to the invention.
Figure 3B:
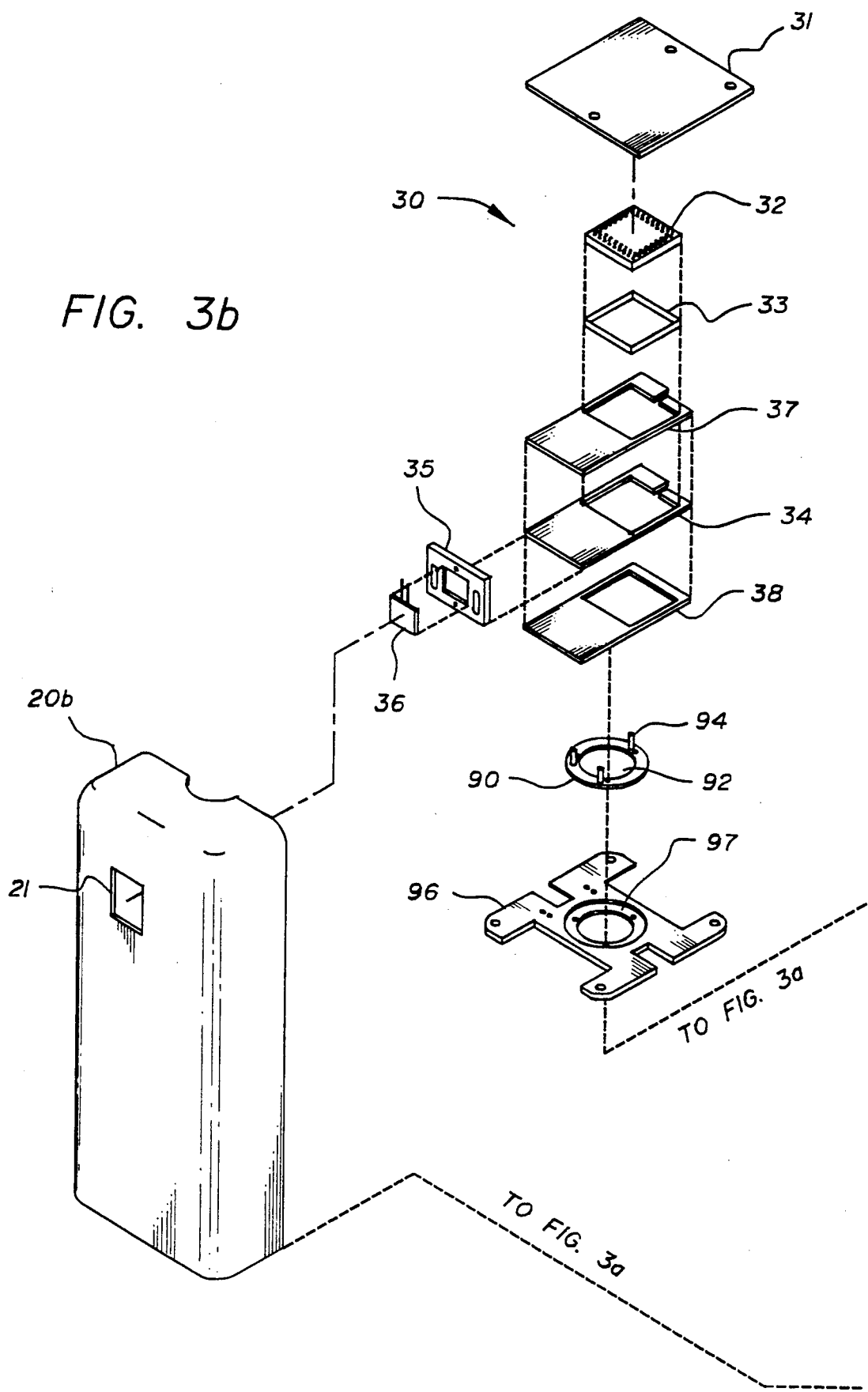

Referring to FIGS. 2, 3A, and 3B, apparatus 10 includes housing 17 and light chamber assembly 40. Housing 17 includes shroud 20, handle assembly 22 and heat sink 24. The interior volume of shroud 20 is divided into upper chamber 18, primary light chamber 100, and secondary light chamber 19. CCD assembly 30 is disposed in upper chamber 18. Light chamber assembly 40 defines primary light chamber 100 in shroud 20.

Shroud 20 has a generally vertical sidewall, which tapers slightly outward toward open base 25 of shroud 20. The top of shroud 20 has a hole 26 defined therethrough. Shroud 20 is made of an opaque material, such as molded plastic. The internal surfaces of shroud 20 ar nickel-plated to increase their electrical conductivity in order to provide electromagnetic shielding from the high voltages generated internally by the components of light chamber assembly 40. The nickel layer is selectively coated with either a light-reflective material, such as flat white paint, or a light-absorbing material, such as flat black paint, to increase or decrease the light diffusing properties of the interior shroud surfaces as described in detail below. In a preferred embodiment, shroud 20 consists of two identical half sections 20a, 20b. The edges of each section 20a, 20b of shroud 20 are fabricated so that sections 20a, 20b, of shroud 20 can be mated together.

Handle assembly 22 serves as a conduit for multiconductor cable 16 and as a means for holding apparatus 10 during operation. Handle assembly 22 is attached to the top of shroud 20 so that multiconductor cable 16 is disposed through hole 26. Heat sink 24 is a thin, wide band that surrounds the outside of an upper portion of shroud 20 and has two functions. First, heat sink 24 serves to hold the two sections 20a, 20b, of shroud 20 together. Second, heat sink 24 serves to dissipate heat generated internally by CCD assembly 30. Through holes 21 defined in an upper portion of the side wall of shroud 20, a portion of CCD assembly 30 is in physical contact with heat sink 24. This permits the conducting of heat generated internally by CCD assembly 30 to heat sink 24. Heat sink 24 then dissipates the heat externally to the surrounding environment. Heat sink 24 may be of copper or other material having high thermal conductivity.

Secondary light chamber 19 is defined by the interior surfaces of shroud 20 below primary light chamber 100 to open base 25. The inventors have observed that the intensity of illumination is greater in the center of the target surface and less near the shroud walls. This non-uniformity of illumination has been observed in an apparatus of the invention, having interior shroud surfaces in the secondary light chamber, of uniform reflectivity. In order to provide greater uniformity of illumination, it has been found desirable to provide variable reflectivity of the interior shroud surfaces in the secondary light chamber. In particular, it has been found desirable to provide a first region 28 of a selected first reflectivity immediately above the lower edge of the shroud. This first region reflects light primarily to an area of the target surface near the shroud walls. The remaining interior surface of the shroud is a second region 27 having a selected second reflectivity. The second reflectivity is lower than the first reflectivity. The second region is disposed above the first region.

The reflectivity of the first and second regions can be selected as desired. For example, the first region may be white, and the second region may be black. Alternatively, one or both regions may be a selected intermediate reflectivity, so long as the reflectivity of the first region is greater than that of the second region.

It has been found by the inventors that the illumination intensity decreases further with distance from the center of the target surface. For example, in a generally square shroud, it has been found by the inventors that illumination intensity is lowest at the corners of the shroud. Shroud 26 of the invention is accordingly provided with a first region 28 having higher reflectivity per unit horizontal distance around the shroud perimeter. In the illustrated embodiment, greater reflectivity per unit distance is obtained in those shroud portions most distant from the center by increasing the height of first region 28. Alternatively, the reflectivity of first region 28 could be increased on selected portions of the shroud most distant from the center. For example, if first region 28 were generally a selected light gray, the selected portions of first region 28 could be white.

It will be understood that there need not be a clear division between the first region and the second region. There may be instead a continuous change between the first reflectivity and the second reflectivity, or a change in a series of steps.

As shown in FIGS. 2 and 3A, first region 28 is provided along the bottom portion of the interior surface of shroud 20 in secondary light chamber 19. In the illustrated embodiment, first region 28 is a white solid band of uniform height, except in the corners of secondary light chamber 19. In each corner, first region 28 includes a triangular upward projection, with the apex of the triangle at the portion the greatest distance from the center of the shroud. First region 28 is, in this embodiment, a coating of flat white paint applied to the interior surface of shroud 20 in secondary light chamber 19 in a band 1.5 inches in height, as measured up from open base 25. To increase light diffusion in the rounded corners of secondary light chamber 19, first region 28 is extended upward in the shape of a triangle, where the apex of the triangle is 2.5 inches in height, as measured up from open base 25. Second region 27 is a coating of flat black paint applied to that portion of the internal surface of shroud 20 in secondary chamber 19 above first region 28. In operation, light radiating from light chamber assembly 40 exits primary light chamber 100 and enters secondary light chamber 19. In secondary light chamber 19, light which strikes second region 27 is absorbed and not permitted to reflect on the target surface. Light which strikes first region 28 is reflected toward the outer edges of the target surface.

Open base 25 of shroud 20 permits apparatus 10 to completely cover the target surface, blocking out substantially all sources of light external to apparatus 10 while allowing light radiating from primary light chamber 100, either directly or after being reflected off first region 28 of secondary light chamber 19, to uniformly illuminate the target surface.

CCD assembly 30 includes CCD printed circuit board 31, CCD sensor 32, thermal interface material 33, cold clamp 34, insulating layers 37, 38, thermoelectric mount 35, and thermoelectric cooler 36. Thermal interface material 33 is disposed about CCD sensor 32. One end of cold clamp 34 is clamped about thermal interface material 33. An opposite end of cold clamp 34 has thermoelectric mount 35 mounted thereon. Thermoelectric cooler 36 is mounted in thermoelectric mount 35. A conventional thermoelectric cooler may be used. A hot output of thermoelectric cooler 36 is placed in contact with heat sink 24. When thermoelectric cooler 36 is activated, heat from CCD sensor 32 will flow through thermal interface material 33, to cold clamp 34, then to thermoelectric mount 35 and finally to heat sink 24. Heat produced internally by CCD assembly 30 is therefore dissipated outside apparatus 10 by heat sink 24.

Light chamber assembly 40 includes lens mounting plate 90, optics plate 96, primary light chamber 100, flash lamp assembly 130, diffuser/polarizer plate assembly 150, lens assembly 160 and infrared filter/analyzer 170. Light chamber assembly 40 is described in more detail below.

Lens mounting plate 90 and optics plate 96 comprise the top portion of light chamber assembly 40. Lens mounting plate 90 has a central cylindrical hole 92 which is threaded to receive lens assembly 160. Lens assembly 160 is disposed through and mounted on lens mounting plate 90 by screwing lens assembly 160 into the threads provided in lens mounting plate 90. Lens mounting plate 90 also has three mounting posts 94 for mounting CCD assembly 30. The assembled components of CCD assembly 30 are fastened to mounting posts 94 with screws. Lens mounting plate 90 is disposed inside and fastened to optics plate 96 by resting lens mounting plate 90 in the circular cut-out 97 provided in optics plate 96 and attaching it to optics plate 96 with screws. Optics plate 96 serves as the mounting base for the upper portion of primary light chamber 100, specifically roof panel 102, which is attached to the bottom of optics plate 96.

Primary light chamber 100 is defined by a light chamber wall, which includes roof panel 102, primary light chamber side walls 104, and a multi-layer wall portion including source plate 110 and diffuser/polarizer plate assembly 150. Primary light chamber side walls 104 are defined as the interior surfaces of shroud 20 between roof panel 102 and source plate 110 Primary light chamber side walls 104 are thus generally vertical, and opaque. Roof panel 102 is a horizontal, planar opaque member which is mounted on the bottom of optics plate 96. Source plate 110 is a partially transparent horizontal planar member. In a preferred embodiment, primary light chamber 100 is substantially in the form of a rectangular parallelepiped. The horizontal top of the parallelepiped is defined by roof panel 102, the four generally vertical sides of the parallelepiped are defined by primary light chamber side walls 104, and the horizontal base of the parallelepiped is defined by source plate 110. It will be understood, however, that primary light chamber 100 may have other configurations within the scope of this invention.

The light chamber wall is made up of an opaque wall portion and a partially transparent wall portion. Roof panel 102 and primary light chamber side walls 104 make up the opaque wall portion of primary light chamber 100. Source plate 110 and diffuser/polarizer plate assembly 150 make up the partially transparent wall portion. Roof panel 102 has a central cylindrical hole 103 to accommodate lens assembly 160. Roof panel 102 is disposed inside apparatus 10 by mounting roof panel 102 on the bottom of optics plate 96 and sliding the assembled structure into slots 109 defined in the interior surfaces of shroud 20.

The interior surfaces of roof panel 102 and primary light chamber side walls 104 reflect light generated by flash lamp assembly 130. Depending on the amount of reflectivity desired, the interior surfaces of roof panel 102 and primary light chamber side walls 104 can be provided with either a specular light-reflective surface or a diffuse light-reflective surface. A specular light-reflective surface is obtained by applying a mirror-like finish directly onto the interior surfaces of roof panel 102 and primary light chamber side walls 104. A light-diffusing surface is obtained by applying a light-diffusing coating, such as flat white paint or a brushed metal surface, directly onto the interior surfaces of roof panel 102 and primary light chamber side walls 104. In the alternative, the material of which roof panel 102 and primary light chamber side walls 104 are specially treated to increase its light-diffusing properties. For example, the surface of the material could be lightly sanded to roughen its surface texture, or sandblasted to pit and roughen the surface finish.

Source plate 110 is partially transparent so that light generated internally by flash lamp assembly 130 can exit primary light chamber 100. In a preferred embodiment, source plate 110 is an opaque plate or sheet, with a plurality of apertures 112 disposed perpendicularly therethrough. Apertures 112 may be cylindrical, for example. The interior surface of source plate 110 is preferably highly reflective. As described above, high reflectivity is obtained by applying a specular or diffusing coating or finish to the interior surface of source plate 110.

The intensity of light incident on the interior surface of source plate 110 varies substantially. The light intensity is highest near flash lamp assembly 130. Opposite flash lamp assembly 130, light reaches source plate 110 only after it is reflected off the interior surfaces of roof panel 102, primary light chamber side walls 104, or the interior surface of source plate 110. The disposition of lens assembly 160 centrally through primary light chamber 100 prevents light emitted by flash lamp assembly 130 from directly reaching all portions of source plate 110. Light intensity therefore decreases as the distance from flash lamp assembly 130 increases. Thus, in order to obtain uniform illumination it is essential that the average transparency of source plate 110 not be uniform across its surface. Apertures 112 may vary in size, frequency, or both, across the surface of source plate 110. This variation in apertures 112 provides varying average transparency across source plate 110.

Figure 4A:
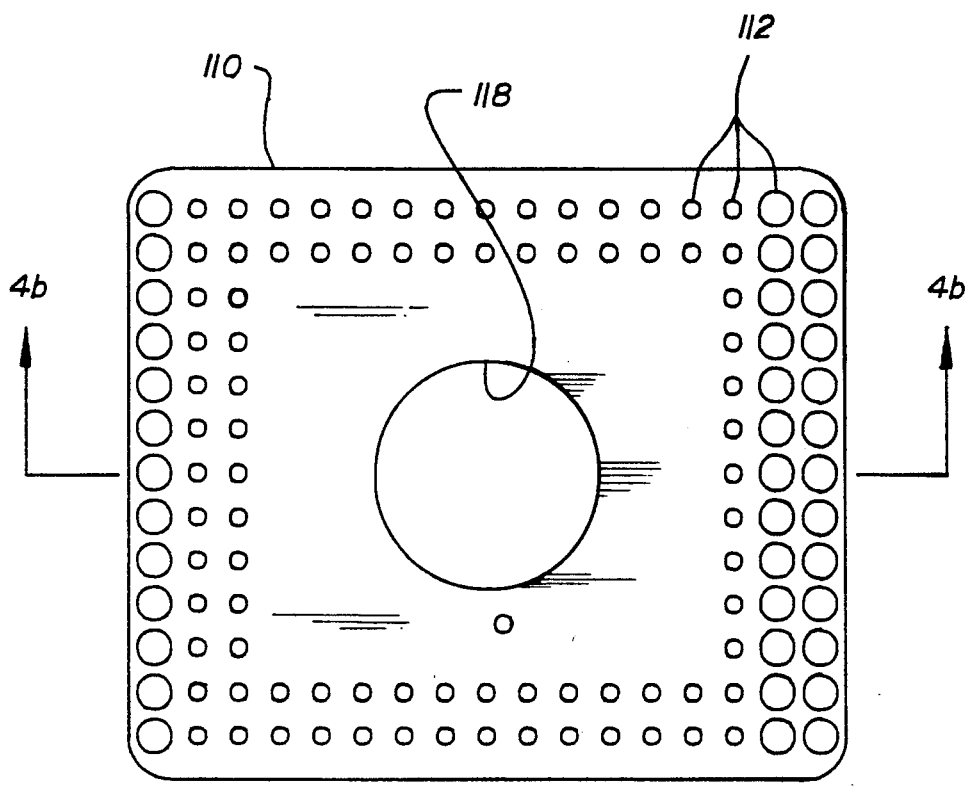
FIG. 4a is a plan view of a source plate according to the invention.

In the illustrated embodiment shown in FIG. 4a, source plate 110 has apertures 112 whose size and frequency are variable with respect to their position across the surface of source plate 110. The gradient of apertures 112 may be two-dimensional in that their size and frequency ma change both along the length and width of source plate 110. Workers in the art may select the diameter of apertures 112 a appropriate for a various applications and lighting conditions desired at the target surface, the typical diameter ranging from 0.15 inches to 0.75 inches. Likewise, the spacing between apertures 112 on the surface of source plate 110 also may be selected as appropriate for various applications and lighting conditions desired at the target surface, the typical center-to-center spacing ranging from 0.125 inches to 0.375 inches. Optimal aperture 112 diameter and spacing for a particular application may be achieved through analysis of empirical data using a prototype source plate 110. Commercial software, such as KB Vision, can be used to test the prototype source plate 110 design to determine the best configuration of aperture 112 placement, diameter and spacing to achieve the desired illumination level and high uniformity at the target surface.

A central cylindrical hole 118 is disposed through source plate 110 to accommodate lens assembly 160. Source plate 110 is disposed inside apparatus 10 by sliding source plate 110 into slots 119 defined in the interior surfaces of shroud 20.

Flash lamp assembly 130 provides the necessary light for illuminating the target surface. Flash lamp assembly 130 includes flash lamp trigger circuit 132, flash lamp 134, flash lamp mounts 135, mounting gaskets 136, electrical contacts 137 and activation wire 138. Flash lamp mounts 135 attach to the bottom of roof plate 102 and optics plate 96 and serve as the mounting base for the various components of flash lamp assembly 130. Flash lamp 134 is disposed through the circular holes in flash lamp mounts 135. Silicone rubber mounting gaskets 136 mounted inside the circular holes provide flash lamp 134 with electrical, thermal and vibrational isolation. Copper electrical contacts 137 surround both outer ends of flash lamp 134. Activation wire 138 provides a high voltage signal to ignite the gases inside flash lamp 134 causing flash lamp 134 to emit light. Flash lamp trigger circuit 132 is mounted to the bottom of flash lamp mounts 135. Flash lamp trigger circuit 132 provides the starting electrical signal to flash lamp 134 through activation wire 138, and also routes electrical power to electrical contacts 137. Flash lamp trigger circuit 132 is disposed in a housing of aluminum to provide electromagnetic shielding, and the top surface of the housing, directly beneath flash lamp 134, is coated with a light-diffusing material to increase its reflectivity. In operation, a flash activation signal is initiated by a controller (not shown) external to apparatus 10. Multiconductor cable 16 and internal wiring (not shown) carry both the flash initiation signal and electrical power to flash lamp trigger circuit 132. Electrical energy in the range of 22-36 joules stored in capacitors inside the controller (not shown) is routed to electrical contacts 137. When the flash initiation signal is received, electrical power is routed through activation wire 138 closing the electrical path to flash lamp 134, providing a transfer of the stored energy to flash lamp 134 and causing the gases inside flash lamp 134 to emit light. Depending on the amount of illumination desired, the flash sequence can last from 100 microseconds to 1 millisecond.

Light diffuser/polarizer plate assembly 150 is mounted, so as to form a portion of a multi-layer partially transparent wall portion of primary light chamber 100, adjacent to and below source plate 110. Light diffuser/polarizer plate assembly 150 includes diffuser plate 152 and polarizing film layer 154. A second glass layer 153 is preferably provided under polarizing film layer 154. A thin laminate (not shown) is provided on either side of polarizing film layer 154 to obtain a more uniform index of refraction. Diffuser plate 152 may be made of glass, with a sandblasted upper surface, for example, and may be 0.06 inches in thickness. Central cylindrical hole 156 is disposed through diffuser plate 152, polarizing film layer 154 and second glass layer 153, to accommodate lens assembly 160. Light diffuser/polarizer plate assembly 150 is disposed inside apparatus 10 by sliding light diffuser/polarizer plate assembly 150 into slot 159 defined in the interior surfaces of shroud 20.

Lens assembly 160 provides the necessary focusing means for CCD assembly 30. Lens assembly 160 includes lens body 162 and lens opening 164. Lens body 162 is disposed through central cylindrical hole 156 in light diffuser/polarizer plate assembly 150, central cylindrical hole 118 in source plate 110, and central cylindrical holes 103 and 97 in roof panel 102 and optics plate 96, respectively, and is attached to and supported on lens mounting plate 90. When apparatus 10 is fully assembled, lens opening 164 abuts the bottom of light diffuser/polarizer plate assembly 150 and extends slightly downward into secondary chamber 19. Because lens assembly 160 is mounted inside apparatus 10 at a fixed distance above the target surface, lens assembly 160 does not require operational adjustments. Proper focusing of the target surface is achieved by simply placing apparatus 10 on the surface to be electronically imaged or scanned.

Infrared filter/analyzer 170 is mounted over lens opening 164. Infrared filter/analyzer 170 eliminates interference caused by radiated light in the infrared region of the spectrum from distorting images of the target surface received by lens assembly 160 and CCD assembly 30. The combination of polarizing film layer 154 and infrared filter/analyzer 170 reduces glare caused by reflections off the target surface.

In operation, an operator activates a switch (not shown) on handle 22 which sends a signal to the controller. The controller in turn sends a processed signal through multiconductor cable 16 and wires (not shown) disposed internal to apparatus 10 to flash lamp trigger circuit 132. Once the signal is received, flash lamp trigger circuit 132 causes flash lamp 134 to fire. Flash lamp 134 illuminates the interior of primary light chamber 100. The light from flash lamp 134 either passes directly through apertures 112 in source plate 110, or is reflected off the interior surfaces of roof panel 102, primary light chamber side walls 104, or source plate 110 before exiting primary light chamber 100 through apertures 112.

Light radiating through apertures 112 in source plate 110 passes through light diffuser/polarizer plate assembly 150. Diffuser plate 152 along with polarizer 154 diffuses and polarizes the light radiating from source plate 110, thereby increasing the uniformity of light illuminating the target surface, and in particular, reducing the occurrence of hot spots forming beneath individual apertures 112. Infrared filter/analyzer 170 cross polarizes light which is reflected back from the target surface. This eliminates substantially all glare caused by specular light reflecting off the target surface and eliminates interference by reflected light in the infrared wavelength of the spectrum, ensuring that a distortion free image is received by CCD assembly 30.

Light reflected from the target surface is received by lens assembly 160 through lens opening 164. Lens assembly 160 focuses primary light on CCD sensor 32. As the portion of lens assembly 160 in primary light chamber 100 is optically sealed, no light from primary light chamber 100 enters lens assembly 160 directly. A signal is provided to further processing components (not shown).

By way of example only, a working embodiment will now be described in detail. Primary light chamber 100 is defined by roof panel 102, primary light chamber side walls 104, source plate 110 and diffuser/polarizer plate assembly 150. Roof panel 102 forms the top of primary light chamber 100. Roof panel 102 is an opaque planar plate, approximately 4.7 inches by 4.6 inches, of aluminum having a thickness of 0.03 inches. A central cylindrical hole 103 approximately 1.47 inches in diameter is provided to accommodate lens assembly 160. The interior surface of roof panel 102 is made of brushed aluminum with 86% reflectivity to make the interior surface reflective of light. Roof panel 102 is disposed inside apparatus 10 by mounting roof panel 102 on the bottom of optics plate 96 and sliding the assembled structure into slots 109 defined in the interior surfaces of shroud 20.

Primary light chamber side walls 104 of primary light chamber 100 are defined by the interior surfaces of shroud 20 between roof panel 102 and source plate 110. Primary light chamber side walls 104 are approximately 1.9 inches in height, and each of the four generally planar sections of primary light chamber side walls 104 are about 5 inches in width. The interior surface of primary light chamber side walls 104 are coated with flat white paint to make the interior surface reflective of light.

Figure 4B:
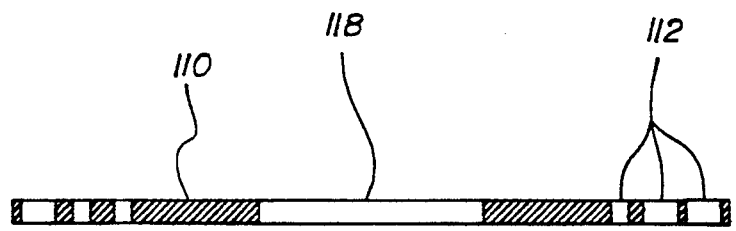

Source plate 110 is an opaque planar plate approximately 4.9 inches by 4.9 inches, made of 0.03 inch thick aluminum sheet. The interior surface of source plate 110 may be made of aluminum having a 93% reflectivity. Good results have been achieved using the source plate 110 configuration illustrated in FIGS. 4a and 4b. In this configuration, apertures 112 are disposed in a grid pattern across the surface of source plate 110. In the left-hand, or first column, apertures 112 are 0.25 inches in diameter and spaced 0.3125 inches apart from center-to-center along the length of the column. The next to the left-hand column, or second column, is spaced 0.28125 inches from column 1, as measured from the center of apertures 112 in the first column to the center of apertures 112 in the second column. In the second column, apertures 112 are 0.125 inches in diameter and are spaced 0.1875 inches apart from center-to-center along the length of the column. Between the second and fifteenth columns, consecutive columns are spaced 0.3125 inches apart from the center of apertures 112 in one column to the center of apertures 112 in an adjacent column. Apertures 112 in the third through fifteenth columns are 0.125 inches in diameter and are spaced 0.3125 inches apart from center-to-center along the length of the column. The fifteenth and sixteenth columns are spaced 0.3125 inches apart from the center of apertures 112 in the fifteenth column to the center of apertures 112 in the sixteenth column. Apertures 112 in the sixteenth column are 0.21875 inches in diameter and are spaced 0.3125 inches apart from center-to-center along the length of the column. The sixteenth and seventeenth, or the two right-hand columns, are spaced 0.3125 inches apart from the center of apertures 112 in the sixteenth column to the center of apertures 112 in the seventeenth column. Apertures 112 in the seventeenth column are also 0.21875 inches in diameter and are spaced 0.3125 inches apart from center-to-center along the length of the column. Apertures 112 in the two right-hand columns are larger because the right-hand side of source plate 110 is disposed inside apparatus 10 further away from flash lamp assembly 130. The larger apertures are required to increase the average transparency of that portion of source plate 110 where the radiated light generated by flash lamp assembly 130 is less intense. The area of source plate 110 including the two right-hand columns may be considered to define a first section having a first average transparency. The area of source plate 100 including the first through fourth, or four left-hand columns, may be considered to define a second section having a second average transparency. The first average transparency is greater than the second average transparency. This difference in average transparency allows more light of lower intensity to pass through the first section. In contrast, less light of greater intensity passes through source plate 110 in the second section, which is directly below and adjacent to flash lamp assembly 130. This equalizes the amount of light received at the target surface.

A central cylindrical hole 118 approximately 2.3 inches in diameter is provided to accommodate lens assembly 160. Source plate 110 is disposed inside apparatus 10 by sliding source plate 110 into slots 119 defined in the interior surfaces of shroud 20 so that the left-hand side of source plate 110, defined by the first through fourth columns, is directly beneath and adjacent to flash lamp assembly 130.

Flash lamp 132 has a rated energy input in the range of 22–36 joules. Diffuser plate 152 is glass with a sandblasted surface. Source plate 110 is disposed about 5.4 inches above the open base 25 of shroud 20. This working embodiment of apparatus 10 has been found to provide illumination with uniform intensity within approximately 90% to the target surface.

The apparatus of the invention provides uniform illumination at the target surface. This uniformity of illumination ensures that the image of the target surface projected on CCD sensor 32 enables the image processing software to operate accurately. This permits apparatus 10 to obtain an image of the entire target surface simultaneously. The uniformity of light illuminating the target surface is controlled by the size, frequency and arrangement of apertures 112 in source plate 110, without the need for complicated reflectors and mirrors as disclosed in the prior art Apparatus 10 is easy to adjust to obtain the proper uniformity of light at the target surface. In contrast to the prior art which requires extensive calculations to determine the proper positions of internally mounted mirrors and reflectors, uniform illumination is obtained with light chamber assembly 40 through empirical testing by varying the size, frequency and arrangement of apertures 112 in source plate 110. Thus, adjustments to an apparatus 10 may be made at a processing facility. Moreover, light chamber assembly 40 can accommodate any type of light source, and is not restricted to either flash-type or point light sources.

Figure 5A:
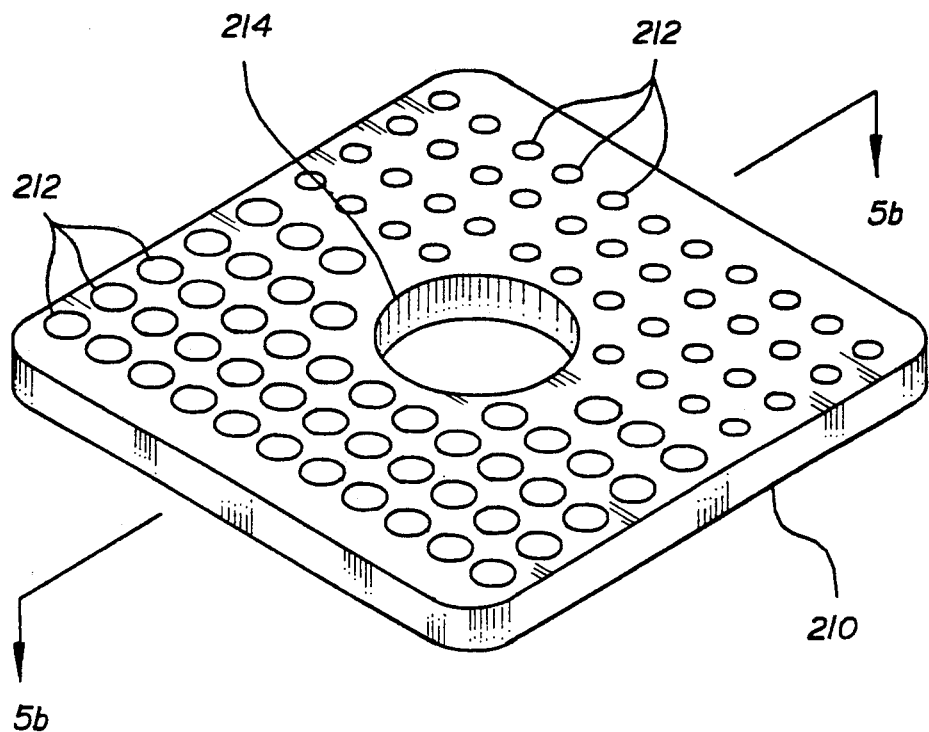
FIG. 5a is an isometric view of a source plate in an alternative embodiment of the invention.
Figure 5B:
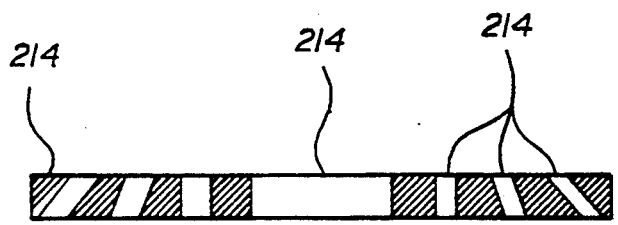

Referring to FIGS. 5a and 5b, an alternative embodiment of a source plate according to the invention is shown. Source plate 210 is a solid body having opposite planar upper and lower surfaces, and having a selected thickness. Source plate 210 has a plurality of transparent apertures 212 disposed through source plate 210 at varying angles to the source plate surfaces. In this embodiment, transparent apertures 212 are, for example, cylindrical holes the axes of which are disposed at varying selected angles from the surfaces of source plate 210. Each aperture 212 has a selected maximum diameter which is preferably less than the selected thickness. Preferably, the selected diameter is less than one-half the selected thickness. The axes may be disposed at a variety of selected angles. This allows light passing through apertures 212 to be directed in a variety of directions. Apertures 212 are disposed through alternative source plate 210 in a grid pattern, the grid being made up of squares typically from about 2/16 inch to about ½ inch on a side, an aperture 212 being provided at each corner and in the center of each square. Light radiating directly from flash lamp assembly 130 or reflected off the interior surfaces of roof panel 102, primary light chamber side walls 104, or source plate 210 passes through apertures 212 only when the radiated light is directed at selected angles corresponding to the angles of apertures 212 in source plate 210. The angle of light that can exit is selected, with reference to the position of secondary light chamber 19 and the height of source plate 210 above the target surface, so that all light passing through apertures 212 is reflected off the interior surfaces of secondary light chamber 19. The exit angle of light is controlled by selected angle, the diameter of the holes, and the thickness of the source plate.

It will be appreciated that there are considerable variations that ca be accomplished in a method and apparatus of the invention without departing from its scope. As a result, although a preferred embodiment of an apparatus of the invention has been described above, it is emphasized that the invention is not limited to a preferred embodiment and there exist other alternative embodiments that are fully encompassed within the invention's scope, which is limited only by the scope of the appended claims.

What is claimed is:

1. An apparatus for providing highly uniform illumination of an area within a predetermined range on a surface, comprising:
   (a) a chamber, defined by a wall, said wall having an opaque portion and a partially transparent portion, said partially transparent portion comprising a first section having a first average transparency and a second section having a second average transparency, an interior surface of said wall being reflective of light; and
   (b) a light source disposed interior to said chamber wherein a camera receiving aperture is defined in said wall, said wall substantially enclosing said chamber.

2. The apparatus of claim 1, wherein said partially transparent wall portion comprises an opaque sheet having a plurality of transparent openings defined therethrough.

3. The apparatus of claim 2, wherein said sheet is substantially horizontal and planar.

4. The apparatus of claim 2, wherein said sheet is a substantially horizontal planar member of a uniform selected thickness, each of said openings being a transparent aperture, the largest diameter of each of said transparent apertures being significantly less than said uniform selected thickness, said openings being disposed at varying angles to sheet.

5. The apparatus of claim 1, wherein said partially transparent wall portion comprises means for diffusing light.

6. The apparatus of claim 1, wherein said partially transparent wall portion further comprises means for polarizing light.

7. The apparatus of claim 1, wherein said light source comprises a flash lamp.

8. The apparatus of claim 1, further comprising a generally sleeve-like shroud having a generally vertical opaque wall, defining a lower opening, said chamber being mounted in an upper portion of said shroud above said lower opening.

9. The apparatus of claim 8, wherein said lower opening is defined by a lower edge of said vertical shroud Wall, said edge lying substantially in a plane.

10. The apparatus of claim 8, wherein an interior surface of said shroud wall has a first region about said lower opening having a first light reflectivity, and a second region, above said first region and below said chamber, having a second light reflectivity, said first light reflectivity being greater than said second light reflectivity.

11. An illumination apparatus, comprising a wall defining and substantially enclosing a chamber, a light source disposed in said chamber, said wall comprising an opaque wall portion and a substantially planar partially transparent wall portion having an average transparency variable with respect to position on said partially transparent wall portion, and comprising an opaque sheet having a plurality of openings which permit light to exit the interior of said chamber defined therein, said partially transparent wall portion further comprising a light diffusing means adjacent to and exterior of said opaque sheet, all interior surfaces of said chamber being reflective of light generated by said light source, said wall having a camera receiving aperture defined therethrough.

12. A method for illuminating a surface for imaging of the surface by a camera, comprising the steps of:
   (a) providing a wall, defining a chamber, said wall comprising an opaque wall portion and a partially transparent wall portion, said partially transparent wall portion having a first section with a first average transparency and a second section having a second average transparency, a camera-receiving aperture being defined through said partially transparent wall portion;

b) disposing a camera lens through said camera-receiving aperture to a predetermined position with respect to the surface; and (c) activating a light source in said chamber to illuminate the surface.

13. The method of claim 12, wherein said step of activating a light source comprises activating a flash lamp.

14. The method of claim 12, where said partially transparent wall portion comprises an opaque sheet having a plurality of transparent openings defined therethrough.

15. An apparatus for providing highly uniform illumination of an area within a predetermined range on a surface, comprising:

(a) a generally sleeve-like shroud having an opaque, generally vertical wall, defining a lower opening; and (b) a light source disposed in said shroud;

an interior surface of said wall having a first region about said lower opening having a first light reflectivity, and a second region, above said first region, having a second light reflectivity, said first light reflectivity being greater than said second light reflectivity; wherein said first region has an average reflectivity per unit distance along a perimeter of the lower opening and at least one selected portion oaf said first region has a reflectivity per unit distance along the perimeter of the lower opening greater than said average reflectivity per unit distance along the perimeter of the lower opening.

16. The apparatus of claim 15, wherein said first region has a uniform reflectivity and an average height above the opening, the height of said first region in said selected portion being greater than said average height.

17. A method for providing highly uniform illumination of an area within a predetermined range on a surface, comprising the steps of:

(a) providing a generally sleeve-like shroud having an opaque, generally vertical wall, defining a lower opening, an interior surface of said wall having a first region about said lower opening having a first light reflectivity, and a section region, above said first region, having a second light reflectivity, said first light reflectivity being greater than said second light reflectivity;

(b) providing a light source in said shroud;

(c) placing the shroud on the surface to be illuminated with the opening facing the surface, and thereby positioning said light source a predetermined distance from the surface; and (d) activating said light source to illuminate the surface.

18. The method of claim 17, further comprising the steps of positioning a camera lens interior to said shroud at a predetermined lens distance from the surface, to permit imaging of the illuminated surface.

19. The method of claim 17, wherein said first region has an average reflectivity per unit distance along a perimeter of the lower opening and at least one selected portion of said first region has a reflectivity per unit distance along the perimeter of the lower opening greater than said average reflectivity.

* * * * *

UNITED STATES PATENT AND TRADEMARK OFFICE
CERTIFICATE OF CORRECTION

PATENT NO. :  5,313,373

DATED :  May 17, 1994

INVENTOR(S) :  Johannes A. S. Bjorner, Kevin Y. Hamada and Kenneth A. Lais

It is certified that error appears in the above-indentified patent and that said Letters Patent is hereby corrected as shown below:

Column 12, line 36, delete "Wall" and insert therefor --wall--.

Column 13, line 30, delete "oaf" and insert therefor --of--.

Signed and Sealed this

Twenty-ninth Day of August, 1995

Attest:

BRUCE LEHMAN

Attesting Officer     Commissioner of Patents and Trademarks